Figure 2:
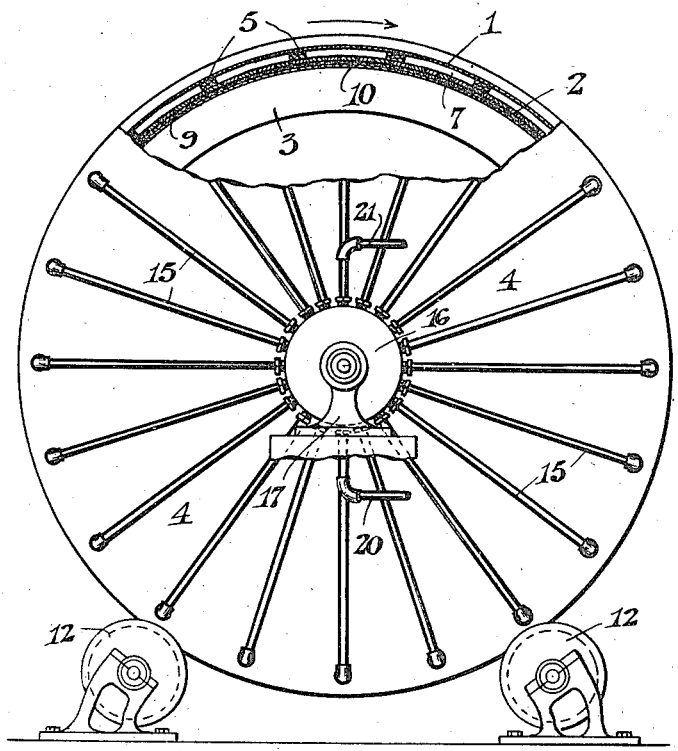

A. M. NICHOLAS.
PROCESS OF SEPARATING LIQUIDS FROM SOLIDS.
APPLICATION FILED NOV. 24, 1916.
1,268,273.
Patented June 4, 1918.
2 SHEETS—SHEET 1.
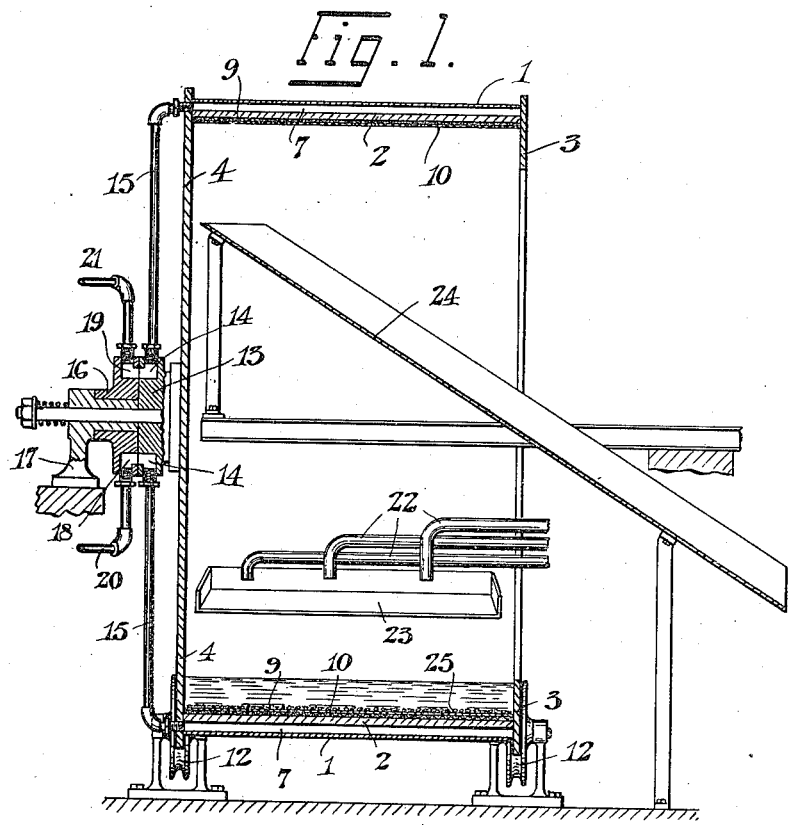
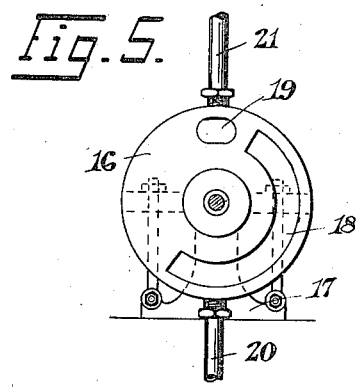
Inventor
A. M. Nicholas.
By his Attorney A. M. NICHOLAS.
PROCESS OF SEPARATING LIQUIDS FROM SOLIDS.
APPLICATION FILED NOV. 24, 1916.

1,268,273.

Patented June 4, 1918.

2 SHEETS—SHEET 2.

Inventor
A. M. Nicholas.
By his Attorney

UNITED STATES PATENT OFFICE.

ASKIN MORRISON NICHOLAS, OF TORRINGTON, BISMUTH, VIA DEEPWATER, NEW SOUTH WALES, AUSTRALIA.

PROCESS OF SEPARATING LIQUIDS FROM SOLIDS.

1,268,273.                    Specification of Letters Patent.        Patented June 4, 1918.

Application filed November 24, 1916. Serial No. 133,116.

*To all whom it may concern:*

Be it known that I, ASKIN MORRISON NICHOLAS, a subject of the King of Great Britain, residing at Block 14, Torrington, Bismuth, via Deepwater, in the State of New South Wales, Australia, have invented certain new and useful Improvements in Processes of Separating Liquids from Solids; and I do declare the following to be a full, clear, and exact description of the invention, such as will enable others skilled in the art to which it appertains to make and use the same.

This process, or method, consists in delivering an aggregate of liquids and solids into a container, in abstracting liquid from the aggregate by vacuum applied through a porous lining of the container, in thereafter inverting the container while maintaining the vacuum on the lining, and in finally discharging the solids from the container when it is inverted or in course of being inverted, by breaking the vacuum and applying fluid pressure instead thereof.

In order that the invention may be more easily understood, reference may be made to the accompanying drawings which diagrammatically illustrate one form of an apparatus such as is shown in my application Serial No. 183,117 which may be used in carrying the invention into effect, although it is to be understood that the improved process is by no means limited to use with this particular form of apparatus.

Figure 3:
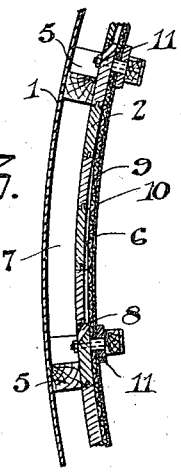
Figure 4:
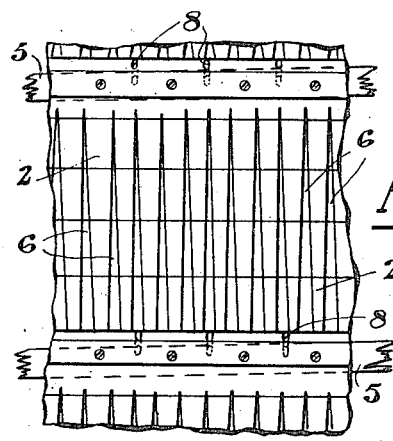

In the drawings,

Figure 1 is a sectional side elevation of the container for the aggregate of liquids and solids, Fig. 2 is a view partly in section of the container shown in Fig. 1, looking toward the right in this figure, Fig. 3 is a sectional detail on an enlarged scale illustrating the construction of the container walls and arrangement of the filtering medium thereon, Fig. 4 is a detail view of the inner wall of the container with the filtering medium removed, and Fig. 5 is a detail view on an enlarged scale of the valve mechanism illustrated in Fig. 1.

The cylindrical container as illustrated in the drawings, comprises an outer shell 1, preferably of metal, an inner concentric shell 2, preferably of wood, and end plates 3 and 4, the annular space between the inner and outer shells being divided into a number of compartments by water-tight partitions 5, as illustrated in Figs. 2 to 4.

The inner surface of the inner shell 2 is formed with taper grooves 6 opposite each compartment 7, these grooves terminating in a transverse gutter at the trailing end, having apertures 8 leading to the corresponding compartment. Over the grooves 6 are laid screens 9 of suitable metal expanded or perforated, and over the screens 9 is laid the filtering medium 10 which may be of cloth, felt, coir matting or other suitable material. The screens and filtering medium may be held in place by battens 11 suitably secured to the inner shell.

The container is shown mounted by means of the end plates 3 and 4 on trundle wheels 12 and it may be rotated by applying power to the shaft on which one pair of these wheels is mounted, although it will be understood that the container may be supported and rotated in any other suitable way.

Secured to the end plate 4 of the container is a rotatable valve member 13 having ports 14, one for each compartment, each compartment being connected to the corresponding port by pipe 15. Coöperating with this rotatable valve member is a stationary valve member 16 carried by a suitable bearing 17, this valve member being provided with two ports 18, 19, to which are connected the pipes 20 and 21 respectively. The pipe 20 is connected to any suitable means for producing suction or vacuum, and the pipe 21 is connected to any suitable source of fluid pressure.

The aggregate of liquids and solids is delivered to the interior of the container by any suitable means, as for example a plurality of pipes 22, which deliver the aggregate onto a trough or apron 23, which in turn delivers the aggregate onto the filtering medium, the arrangement preferably being such that the aggregate is delivered onto the filtering medium as it is moving downwardly into its lowermost position. A chute 24 suitably supported is provided for receiving the separated solids from the upper portion of the container.

In carrying out the process, the aggregate is delivered by the pipes 22 and trough 23 onto the lowermost portion of the filtering medium, and the compartments 7, above which the aggregate is deposited, are connected with the suction or vacuum producing means by the corresponding ports 14 successively registering with the port 18 so that the liquid is extracted from the aggregate through the filtering medium 10 and screens 9, grooves 6, apertures 8, compartment 7, pipe 15, ports 14 and 18 and pipe 21. The vacuum is maintained during the act of inverting the container owing to the fact that the ports 14 continue to register with the semi-circular shaped port 18, whereby the solid residue is retained on the filtering medium against the influence of gravity. Thus as the compartments successively move into their lowermost positions, they are connected with the vacuum producing means and the liquid is abstracted from the aggregate deposited above such compartments, such vacuum being maintained in the latter until the container is substantially inverted. The ports 14, as the corresponding compartments move into their uppermost positions, move out of register with the vacuum port 18 and immediately thereafter move into register with the pressure port 19, whereby a fluid blast or pressure, preferably of a jerky nature, is applied to the filtering medium through the ports 19, 14, pipe 15, compartment 7, apertures 8 and grooves 6, whereby the filtering medium is freed from the solid residue and the latter is deposited on the delivery chute 24.

The plate 3 extends inwardly to a depth dependent upon the quantity of material desired to be treated and the size of the apparatus. Thus a body or bath of the aggregate remains in the bottom of the container, fresh quantities being delivered thereto as fast as liquid and solids are removed therefrom by the action above described, and in this body or bath of aggregate the heavier and coarser solid material is deposited first upon the porous lining, while the finer, lighter and less pervious material is deposited later, whereby not only is the tendency of the lining to become clogged reduced to a minimum and the abstraction of the liquid through it facilitated but the final discharge of the solids is rendered more effectual.

In order to increase the effectiveness of the method above described in cases where the suspended solids consist wholly, or chiefly, of fine and adhesive material, means may be provided for applying a preliminary coating of comparatively coarse granular material 25, such as sand, to the porous lining, before the aggregate to be separated is delivered to it, as shown, for example, in my co-pending application above referred to.

In most cases the porous lining will be composed of textile, or other flexible material, which, by the application of the above-mentioned sudden blast of air, experiences an impulse or jerk very effective for detaching the adherent solids.

I claim—

1. A process of separating liquid from solids consisting in delivering the mixture into a container having a filtering medium spaced from the walls of said container, abstracting the liquid from the mixture by means of suction acting through the said medium, inverting the container and maintaining the suction during the inverting thereof to hold the solids against the medium, discontinuing the suction, and subjecting the medium to a fluid blast to free it of the solids.

2. A process of separating liquid from solids consisting in applying a layer of granulated material upon a filter, delivering a mixture of liquid and solids upon said layer, abstracting the liquid from the mixture by means of suction acting through said filter and said layer of granulated material, discontinuing the suction, and treating the filter with a cleansing medium.

In testimony whereof I have signed my name to this specification in the presence of two subscribing witnesses.

ASKIN MORRISON NICHOLAS.

Witnesses:
  ALICE HARKER,
  FLORENCE SINCLAIR.